United States Patent
Addie

[15] 3,699,351
[45] Oct. 17, 1972

[54] BI-MODAL VEHICLES WITH DRIVE MEANS FOR EXTERNAL OR SELF-PROPULSION

[72] Inventor: Albert N. Addie, La Grange Park, Ill.

[73] Assignee: General Motors Corporation, Detroit, Mich.

[22] Filed: Aug. 2, 1971

[21] Appl. No.: 168,068

[52] U.S. Cl. ..................290/14, 290/17, 290/52, 318/440, 105/36, 105/49, 74/686
[51] Int. Cl. ...................................................B60l 11/14
[58] Field of Search............290/14, 9, 15, 29, 39, 52; 318/13, 17, 440; 60/39.16; 74/686; 307/67, 68; 180/65; 105/49, 36

[56] References Cited

UNITED STATES PATENTS

| | | |
|---|---|---|
| 3,525,874 | 8/1970 | Toy..............................290/14 |
| 1,817,820 | 4/1931 | Higley.........................290/14 |
| 3,566,717 | 3/1971 | Berman et al. ..............74/686 |
| 2,209,641 | 7/1940 | Weber.....................290/14 X |
| 3,565,202 | 2/1971 | Evans et al...............105/36 X |
| 1,991,094 | 2/1935 | Highley...................290/14 X |

Primary Examiner—G. R. Simmons
Attorney—J. L. Carpenter et al.

[57] ABSTRACT

A bi-modal vehicle, such as a rail car, is provided in a preferred embodiment with a propulsion turbine and an electro-mechanical transmission arranged to drive the vehicle either from the turbine or from an external source of electrical power. The electro-mechanical transmission includes a split torque feature whereby, in the self-propelled mode, some of the turbine torque is delivered mechanically to the output shaft while the remainder passes through an electrical path including a motor and generator combination. In the external electric drive mode, both the generator and motor of the transmission are utilized as drive motors directly driving the output shaft. Numerous additional features are included.

8 Claims, 2 Drawing Figures

INVENTOR.
Albert N. Addie
BY
Robert J. Outland
ATTORNEY

3,699,351

BI-MODAL VEHICLES WITH DRIVE MEANS FOR EXTERNAL OR SELF-PROPULSION

BACKGROUND OF THE INVENTION

This invention relates to vehicles having bi-modal drive means and to vehicle drive means providing for either externally powered or self-powered operation of a vehicle. In a more specific aspect, the invention relates to drive means for a high performance bi-modal rail car.

In order to maintain acceptable schedules, high performance, light weight commuter type rail cars must be capable of accelerating rapidly. At present, acceleration rates on the order of 2 miles per hour per second are considered desirable. Elimination of unnecessary weight is important in the design of such rail vehicles, since this directly reduces the power requirements for achieving the desired acceleration. One way of minimizing weight in a bi-modal rail car vehicle arranged to operate either with an external electrical power supply or as a self-propelled unit powered by an on-board prime mover, is the dual use; i.e., used in both modes, of as many transmission and drive components as possible. Also important is provision of as high a transmission efficiency as possible to avoid the need for cooling equipment to dissipate transmission losses and to make available at the rail as large a fraction of engine power as possible so as to minimize weight of the installed prime mover.

Another requirement in such bi-modal rail car operation is the supply in both operating modes of auxiliary power for heating, lighting, air conditioning and control. If this auxiliary power can be supplied without the use of an auxiliary prime mover, a further advantage in weight reduction may be gained. Finally, the drive system for a bi-modal rail car, in addition to providing for accelerating and driving the unit, should be capable of dynamically braking the car in either mode of operation.

SUMMARY OF THE INVENTION

The present invention provides a bi-modal vehicle such as a rail car or the like with drive means which permit the vehicle to be driven either from an external electrical power source or to be self-propelled by means of an on-board power unit such as a diesel engine or gas turbine. The drive means provides high transmission efficiency with dual use of major transmission components in both operating modes and in dynamic braking.

A feature of the invention is that it provides split torque transmission means through which torque is delivered from the on-board power source through a combination of mechanical and electrical paths for driving the vehicle. The transmission includes a pair of rotating electrical machines which in the self-propelled mode are connected together as a generator and motor forming a part of the electrical torque path of the transmission. In the external electrically powered mode of operation, both electrical machines are arranged to act as drive motors and to be powered from an external power source through connection with a third rail or other means of external power supply.

Another feature of the invention is that the transmission means includes suitable clutches and/or brakes to connect one of the electrical machines directly to the transmission output shaft when it is acting as a motor in the externally powered mode and through a gear train to the on-board power unit when it is acting as a generator in the self-powered mode.

Still another feature of the invention is that control means are provided to operate the on-board power unit at a constant output speed so as to provide for the constant speed drive of an auxiliary alternator mechanically connected with the power unit output.

Yet another feature is that an oil pump is driven directly by the auxiliary alternator to supply pressure oil for lubricating the transmission gearing and operating the clutches. A further feature is that an overrunning clutch is provided in the drive to the auxiliary alternator so that the alternator may be electrically driven by external power when the on-board power source is shut down, thereby providing for pump operation during either operating mode of the vehicle.

These and other features of the invention will be more clearly understood from the following description of a preferred embodiment, taken together with the accompanying drawings.

DESCRIPTION OF THE PREFERRED EMBODIMENT

Figure 1:
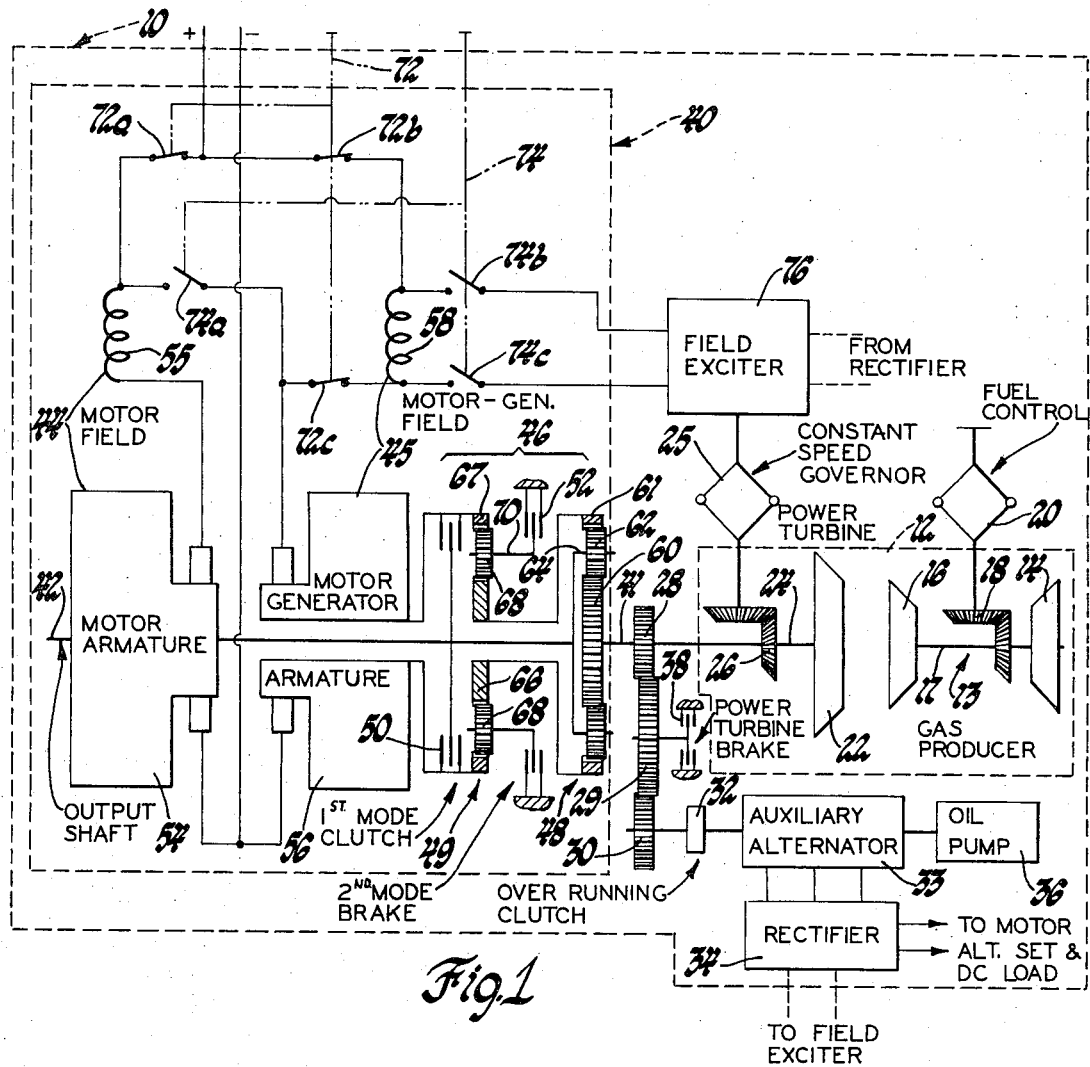
FIG. 1 is a schematic diagram illustrating a bi-modal drive means as installed in a vehicle according to the invention.

Referring now in detail to FIG. 1 of the drawing, there is disclosed a bi-modal vehicle generally indicated by numeral 10. Vehicle 10, shown schematically, represents in this instance a light weight commuter type rail car which it is desired to operate in either of two modes; e.g., third rail 650-volt DC supply or self-propelled by an on-board prime mover.

For this purpose, vehicle 10 is equipped with drive means including a vehicle mounted prime mover 12 which may be of any suitable type. In the preferred arrangement, prime mover 12 is a gas turbine which is provided with gas-producing means 13, including a compressor wheel 14 and a turbine wheel 16 connected by a shaft 17. For control purposes, the gas producer 13 is connected through suitable gearing 18 with a fuel control device 20 operable in response to manual control of the vehicle operator. Gas turbine 12 further includes a power turbine 22 which is arranged to be driven by the gas produced by gas producer 13 and is provided with an output shaft 24. A governor 25 is connected through suitable gearing 26 with the turbine output shaft 24 for maintaining a constant rotational speed for the turbine for a purpose to be subsequently described.

Connected with the turbine output shaft 24 is a gear train, including a drive gear 28, idler gear 29 and driven gear 30, the latter being connected through an overrunning clutch 32 to an auxiliary alternator 33. Alternator 33 is driven by the power turbine during operation of the prime mover and supplies alternating current for powering varying accessories on the rail car vehicle 10.

Preferably, a rectifier 34 is connected with the alternator to convert at least some of the supplied power to DC. Some of the DC power is used directly to supply power for use in the transmission, as will be subsequently described and may also be utilized to operate accessories on the rail car, such as air conditioning. The remainder of the DC power may be supplied to an on-board motor-alternator set, not shown, to provide alternating current of a desired 60-cycle frequency for car lighting and/or other requirements. When the prime mover is not in operation, the motor-alternator set may be driven in known manner from an outside power source.

Directly connected with the auxiliary alternator shaft is an oil pump 36 which is used to supply pressure oil for lubricating the gears and operating the clutches and brakes of the transmission to be subsequently described. Provision of the overrunning clutch 32 in the drive train permits the auxiliary alternator to be driven electrically through current supplied by the motor-alternator set when the prime mover 12 is not operating so that the oil pump may be driven in either mode of operation of the rail car vehicle 10.

A brake 38 is provided in conjunction with idler gear 29 and is engageable to ground the idler gear and brake the power turbine shaft when the prime mover 12 is inoperative. This prevents driving of the power turbine through friction of the subsequently to be described transmission gear train. Such drive would be undesirable when the prime mover is down since lubrication of the power turbine gearing is provided through means driven by the gas producer.

In order to transmit the power of the prime mover 12 to the vehicle drive wheels or, alternatively, to provide for driving the vehicle from an external electrical power source, the vehicle is provided with an electro-mechanical transmission 40. Transmission 40 includes an input shaft 41, and output shaft 42, a pair of rotating electrical machines 44 and 45, and differential drive means 46, including first and second planetary gear sets 48 and 49, respectively. In addition, friction drive establishing means, including a first mode clutch 50 and a second mode brake 52, are provided for purposes to be subsequently described.

Electrical machine 44 comprises an electric motor having a rotatable armature 54 and a stationary field 55 which is permanently connected in series with the armature. Armature 54 is directly connected to the transmission output shaft 42 for delivering driving torque thereto. Electric machine 45 is arranged to act either as an electric motor or generator and includes a rotatable armature 56 and a stationary field 58 which is arranged to be connected either in series with the armature 56 or to be connected for excitation separately from the armature.

In the differential drive means 46, planetary gear set 48 includes a sun gear 60, a ring gear 61 and a plurality of planet gears 62, which engage the respective sun gear and ring gear and are rotatably supported by a planet carrier 64. Planetary gear set 49 likewise includes a sun gear 66, a ring gear 67 and a plurality of planet gears 68 which engage their respective sun and ring gears and are rotatably supported on a suitable carrier 70.

The sun gear 60 of planetary gear set 48 is directly connected with the transmission input shaft 41 for driving by the power turbine 22. Planetary gears 62 are, in turn, connected through carrier 64 directly with the transmission output shaft 42 while ring gear 61 is drivably connected with the sun gear 66 of planetary gear set 49. Planetary gears 68 of the latter gear set are connected through their carrier 70 with brake 52 which is arranged to, upon engagement, ground the planetary carrier so that the gear set 49 operates as a direction reversing and speed reducing star gear, the reduction ratio of which is chosen to establish desired, and in this case equal, electrical machine speed ranges. Ring gear 67 is directly connected to the armature 56 of electrical machine 45. Clutch 50 is arranged between the armature 56 and the transmission output shaft 42 so that when clutch 50 is engaged, armature 56 is directly connected to the output shaft.

Certain electrical connection and control means are also provided in the inventive combination for purposes to be subsequently described. These include connecting means, including a first electrical contactor 72 having contacts 72a, 72b and 72c, and a second electrical contactor 74 having contacts 74a, 74b and 74c. In addition, there is provided field exciter means 76 which are supplied with DC electrical power by the rectifier and operated by the turbine speed governor 25 in a manner to be subsequently described.

In operation, in the first, externally powered, vehicle drive mode, electrical contactor 74 is open and electrical contactor 72 is closed. In this mode, contacts 72a, b and c are closed, connecting the fields of both electrical machines in series with their armatures and providing for the supply of electrical current thereto from an external power source as controlled by suitable operator actuated control means, not shown. Operation in this mode also requires that clutch 50 be engaged so that armature 56 of machine 45 is directly connected to the output shaft 42. Both electrical machines are then in condition to be operated as drive motors and to supply their output torque directly to the transmission output shaft for delivery to the vehicle drive wheels.

During operation in the first mode, brake 52 must be disengaged to break the driving connection between the armature 56 and the power turbine 22. The prime mover 12 may be operated or shut down as desired during operation in the above described first operating mode. If the prime mover is operating, it may be used to drive the auxiliary alternator 33 and oil pump 36 through the drive means previously described. If the prime mover is shut down, the auxiliary alternator may be driven electrically as previously mentioned to drive the oil pump 36 so as to supply pressure oil for lubricating the transmission gears and operating the various clutch and brake mechanisms.

In order to operate in the second, self-propelled mode, contactor 72 must be opened and contactor 74 closed, while clutch 50 is disengaged, brake 52 is engaged and the power turbine brake 38 is disengaged. The closing of contactor 74 closes contacts 74a, b and c and electrically connects the field 58 of electrical machine 45 to be separately excited by the field exciter 76 as controlled by the operation of the turbine speed governor 25. Such closing also connects electrical machine 45 with machine 44 such that machine 45 acts as a generator, supplying its electrical output to machine 44 for the generation of output torque thereby.

Figure 2:
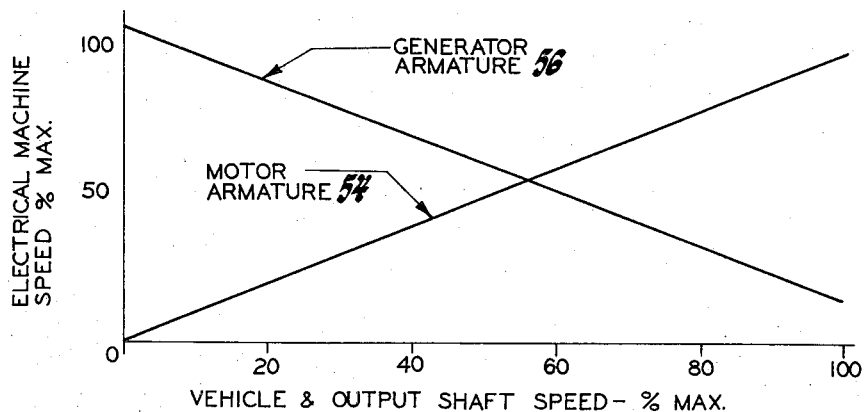
FIG. 2 is a graph of vehicle and output shaft speeds versus operating speeds of the electrical machines in the split torque transmission utilized in the preferred embodiment of FIG. 1.

In the second mode of operation, the prime mover 12 drives sun gear 60, the torque from which is delivered through a split path to planetary carrier 64 to the output shaft 42 and through ring gear 61 and gear set 49 to the armature 56 of electrical machine 45. The differential action of the gear set 48 causes a speed relationship between the transmission output shaft and the two electrical machine armatures as is shown in FIG. 2. When the vehicle is stopped, motor armature 54 and the output shaft 42 are stationary while generator 56 is rotating at its maximum speed.

The application of prime mover power in this condition causes a high current flow from electrical machine 45 to machine 44, which has low resistance in its stalled condition. Accordingly, a high torque is applied through the electrical path of the transmission and a relatively lower torque is applied through the mechanical path. As the vehicle accelerates, the output shaft and armature 54 increase in speed together, while armature 56 is reduced in speed until at the maximum vehicle speed the speed of armature 54 is relatively slow. In this condition, a relatively small current is delivered between the two electrical machines and the torque through the mechanical path of the transmission is substantially greater than that through the electrical path, with resultant high efficiency.

During operation in the self-propelled mode, fuel control 20 delivers fuel to the turbine gas producer at a rate determined by the vehicle operator. Governor 25 actuates field exciter 76 to apply excitation to the field 58 of electrical machine 45 in the degree necessary to develop sufficient drive torque in the vehicle transmission to maintain the power turbine speed at the desired level.

The above described drive means, in addition to providing two modes of vehicle drive operation, are further capable of being used in conjunction with known equipment systems to provide dynamic braking of the vehicle. In such use, electrical machines 44 and 45 are both arranged through connection means, not shown, to act either as self-excited or separately excited generators with their generated electrical output being dissipated into resistance grids in a known manner. The connection of electrical machine 44 for this purpose can be immediately accomplished in either mode of operation since the armature of this machine is always directly connected with the output shaft 42. Electrical machine 45 is likewise so connected during operation in the externally powered first mode of operation. However, when operating in the second self-powered mode, machine 45 cannot be used for dynamic braking until, through release of brake 52 and engagement of clutch 50, armature 56 is connected directly to the output shaft 42.

In order to provide such action over the full range of operating speeds, it is required that clutch 50 be capable of accelerating a substantial load upon engagement. For example, at maximum vehicle speeds the clutch must accelerate armature 56 from a very slow speed up to nearly its maximum speed in order to connect it with the output shaft. An alternative to this arrangement is to operate the dynamic braking of the vehicle at half capacity, using only electrical machine 44 until the vehicle slows down to mid-speed, at which point the speeds of output shaft and the armature of machine 45 are approximately equal. At this point, engagement of clutch 50 can be made with little load shock and use of full dynamic braking is possible thereafter.

Operation of the vehicle in a reverse direction may be provided for by the addition of suitable mechanical and/or electrical means not shown. For example, reverse gear means could be applied to the output shaft 42. Alternatively, a reverse gear could be applied to the transmission input shaft for operation in the self-propelled mode with reversing electrical connections being supplied for external powering of the electrical machines in the externally powered mode. Other suitable arrangements could also be utilized.

While the invention has been described by reference to a specific embodiment, it is apparent that numerous changes could be made in the application of the major concepts and of the various details making up the inventive disclosure. Accordingly, the invention is intended to be limited only by the language of the following claims.

I claim:

1. An electro-mechanical transmission comprising differential drive means having an input element and first and second output elements, said input element being drivably connectable to a source of mechanical power, a transmission output member drivably connected with said first differential output element, a first electrical machine operable as a motor and drivably connected with said transmission output member, a second electrical machine capable of operation either as a motor or as a generator, first friction drive establishing means operable in a first transmission operating mode to drivably connect said second electrical machine to said transmission output member, second friction drive establishing means operable in a second transmission operating mode to drivably connect said second differential output element to said second electrical machine for driving said second electrical machine as a generator, and electrical connection means operable in said first operating mode to connect said first and second electrical machines to an external source of electric power for driving said electrical machines as motors, said connection means being operable in said second mode to connect said second electrical machine for operation as a generator and to deliver the generated electrical output of said second electrical machine to said first electrical machine.

2. An electro-mechanical transmission comprising first and second planetary gear sets, each including a sun gear, a ring gear, and planet gears engaging both their respective sun and ring gears and connected to a carrier, said first planetary ring gear being drivably connected with said second planetary sun gear, a transmission input member drivably connected with said first planetary sun gear, a transmission output member drivably connected with said first planetary carrier, first and second electrical machines, said first machine being operable as a motor and drivably connected with said transmission output member, said second machine being operable either as a motor or a generator and being drivably connected with said second planetary ring gear, first friction drive establishing means between said second machine and said transmission output member and engageable to drivably connect them in a first transmission operating mode, second friction drive establishing means between said second planetary carrier and ground and engageable to ground said second carrier in a second transmission operating mode, whereby said second machine is drivably connected through said second and first planetary gear sets with said transmission input member, and electrical connection means operable in said first mode to electrically connect said first and second machines to an external source of electric power for operating said machines as motors and said connection means being operable in said second mode to connect said first machine to receive generated current from said second machine.

3. Drive means for a bi-modal vehicle operable in a first operating mode from an external electrical source and in a second operating mode as a self-powered vehicle, said drive means comprising a vehicle-mounted prime mover having a mechanical output, differential drive means having an input element drivably connected with said power source output and first and second output elements differentially connected with said input element, a drive output member drivably connected with said first differential output element, a first electrical machine operable as a motor and drivably connected with said drive output member, a second electrical machine capable of operation either as a motor or as a generator, first friction drive establishing means operable in said first operating mode to drivably connect said second electrical machine to said drive output member, second friction drive establishing means operable in said second operating mode to drivably connect said second differential output element to said second electrical machine for driving said second electrical machine as a generator, and electrical connection means connecting with said first and second electrical machines, said connection means being operable in said first operating mode to connect said first and second electrical machines to an external source of electric power for driving said electrical machines, and said connection means being operable in said second operating mode to connect said second electrical machine for operation as a generator and to deliver the generated electrical output of said second electrical machine to said first electrical machine.

4. The drive means of claim 3 and further comprising an auxiliary alternator drivingly connected to said vehicle mounted prime mover mechanical output to be driven thereby and control means associated with said vehicle-mounted prime mover and operable to maintain during operation a constant speed for said mechanical output.

5. The drive means of claim 4 wherein said electrical connection means include means to connect the field of said second electrical machine for series excitation by the armature current or for said connection means being arranged to provide for series excitation in said first operating mode and to connect said field with separate exciter means in said second operating mode, said exciter means being controlled by said prime mover control means to vary the power absorbed by said second electrical machine as necessary to maintain said prime mover output speed constant.

6. The drive means of claim 4 and further comprising an oil pump drivingly connected with said auxiliary alternator and driven thereby, and an overrunning clutch in the driving connection between said auxiliary alternator and said mechanical output and arranged to permit said alternator to be driven electrically when said vehicle mounted prime mover is not in operation, whereby said oil pump may be driven in either operating mode.

7. In combination with a bi-modal vehicle, drive means operable in a first mode from an external electrical source and self-powered in a second mode, said drive means comprising a vehicle mounted gas turbine including gas-producing means and a power turbine adapted to be driven by gas from said gas-producing means, said power turbine having an output shaft, first and second planetary gear sets each including a sun gear, a ring gear and planet gears engaging both their respective sun and ring gears and connected with a rotatable carrier, said power turbine output shaft being drivably connected to said first planetary sun gear and said first planetary ring gear being drivably connected with said second planetary sun gear, a drive output member drivably connected with said first planetary carrier, first and second electric machines each having a rotatable armature and a stationary field, said first machine having its field connected in series with its respective armature and having its armature drivably connected with said drive output member, said second machine having its armature drivably connected with said second planetary ring gear, a first friction drive establishing means between said second machine armature and said drive output member and engageable to drivably connect them in said first mode, a second friction drive establishing means between said second planetary carrier and ground and engageable to ground said second carrier in said second mode, whereby said second machine armature is drivably connected through said first and second planetary gear sets with said power turbine output shaft, first electrical connection means operable in said first mode to electrically connect said first and second machines to an external source of electric power for driving said machines and to connect the field of said second machine in series with its armature and second electrical connection means operable in said second mode to electrically connect said first machine to receive generated current from said second machine and to connect the field of said second machine to separate excitation means for excitation thereby.

8. The combination of claim 7 and further comprising an auxiliary alternator drivingly connected with said power turbine output shaft to be driven thereby, speed control means connected with said power turbine output shaft and with said field excitation means, said speed control means being effective during operation in said second mode to maintain turbine output shaft speed constant by varying the excitation of said second machine field to control the torque of said turbine output shaft, an oil pump connected with and driven by said auxiliary alternator, and an overrunning clutch in the driving connection between said auxiliary alternator and said turbine output shaft, said overrunning clutch being arranged to permit said alternator to be electrically driven when said power turbine is not operating so as to provide for the driving of said pump under all operating conditions.

* * * * *

PO-1050
(5/69)

UNITED STATES PATENT OFFICE
CERTIFICATE OF CORRECTION

Patent No. 3,699,351  Dated October 17, 1972

Inventor(s) Albert N. Addie

It is certified that error appears in the above-identified patent and that said Letters Patent are hereby corrected as shown below:

Col. 6, Lines 55 - 62 should read:

--first and second planetary gear sets, each including an input gear, an output gear, and a rotatable carrier supporting planet gears interconnecting their respective input and output gears, said first planetary output gear being drivably connected with said second planetary input gear,
   a transmission input member drivably connected with said first planetary input gear,--.

Col. 7, Line 3, "ring gear" should read --output gear--.

Col. 8, Line 6, should read --by the armature current or for separate excitation, said connection means--.

Col. 8, Lines 32 - 39 should read:

--first and second planetary gear sets each including an input gear, an output gear and a rotatable carrier supporting planet gears interconnecting their respective input and output gears, said power turbine output shaft being drivably connected to said first planetary input gear and said first planetary output gear being drivably connected with said second planetary input gear,--.

Col. 8, Line 49 should read:  --drivably connected with said second planetary output gear,--.

Signed and sealed this 1st day of May 1973.

(SEAL)
Attest:

EDWARD M. FLETCHER, JR.        ROBERT GOTTSCHALK
Attesting Officer              Commissioner of Patents